United States Patent [19]
Katsuaki

[11] Patent Number: 5,025,157
[45] Date of Patent: Jun. 18, 1991

[54] LIGHT SCANNING SYSTEM FOR A STIMULABLE SHEET INCLUDING VACUUM AND ROLLER SHEET HOLDING MEANS

[75] Inventor: Muraishi Katsuaki, Kanagawa, Japan
[73] Assignee: Fuji Film Co., Ltd., Kanagawa, Japan
[21] Appl. No.: 408,014
[22] Filed: Sep. 14, 1989
[30] Foreign Application Priority Data Sep. 14, 1988 [JP] Japan ................................ 63-230598

[51] Int. Cl.$^5$ ............................................. G03B 42/00
[52] U.S. Cl. ................................. 250/327.2; 250/484.1
[58] Field of Search ........................... 250/327.2, 484.1

[56] References Cited
U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,651,220 | 3/1987 | Hosoi et al. | 358/471 |
| 4,750,045 | 6/1988 | Ohara et al. | 358/494 |
| 4,886,968 | 12/1989 | Ohnishi et al. | 250/327.2 |
| 4,945,238 | 7/1990 | Muraishi | 250/327.2 |

FOREIGN PATENT DOCUMENTS

| | | | |
|---|---|---|---|
| 11395 | 2/1981 | Japan . | |
| 6127351 | 8/1987 | Japan | 250/327.2 |
| 6358435 | 3/1988 | Japan | 250/327.2 |

Primary Examiner—Constantine Hannaher
Assistant Examiner—Jacob M. Eisenberg
Attorney, Agent, or Firm—Sughrue, Mion, Zinn, Macpeak & Seas

[57] ABSTRACT

A light beam scanning system has a sheet holding member which is provided with a concave cylindrical sheet support surface on which a recording sheet is supported. A suction box draws the recording sheet against the sheet support surface by suction. A spinner has a light deflector mirror which reflects a scanning light beam on the central axis of the cylindrical sheet support surface toward the recording sheet on the sheet support surface and a condenser lens system which converges the reflected scanning light beam on the recording sheet. The light deflector mirror and the condenser lens system are integrally rotated about the central axis to cause the scanning light beam to scan the recording sheet in a main scanning direction. A sub-scanning mechanism moves the sheet holding member in a sub-scanning direction parallel to the central axis relative to the spinner. A pair of holding rollers are spaced from each other in the sub-scanning direction with the spinner intervening therebetween and are opposed to the sheet support surface at a distance slightly larger than the thickness of the recording sheet. Each of the holding rollers being fixedly supported relative to the spinner in the sub-scanning direction and being able to freely rotate about a rotational axis which is parallel to the central axis of the sheet support surface.

3 Claims, 4 Drawing Sheets

LIGHT SCANNING SYSTEM FOR A STIMULABLE SHEET INCLUDING VACUUM AND ROLLER SHEET HOLDING MEANS

BACKGROUND OF THE INVENTION

1. Field of the Invention

This invention relates to a light beam scanning system which causes a light beam to scan a recording medium in order to record image information on the recording medium or to read the image information recorded on the recording medium.

2. Description of the Prior Art

When certain kinds of phosphors are exposed to radiation such as X-rays, u-rays, α-rays, β-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, which is used when the radiation image of the object is reproduced as a visible image on a recording material such as photographic film, a display device such as a cathode ray tube (CRT), or the like.

Recently, the stimulable phosphor sheet has been put into use in various fields in addition to the medical field such as the radiation image recording. For example, this applicant has proposed a method of recording and reproducing electron microscopic images by the use of the stimulable phosphor sheet. See U.S. Pat. No. 4,651,220 and U.S. patent application No. 251,982 now U.S. Pat. No. 4,889,990, and the like. The method basically comprises the steps of exposing a stimulable phosphor sheet to cathode rays which have passed through a specimen under vacuum in order to store a cathode ray image on the stimulable phosphor sheet, scanning the stimulable phosphor sheet with stimulating rays thereby causing the stimulable phosphor sheet to emit light in proportion to the amount of energy stored during exposure to the cathode rays, photoelectrically detecting the light thereby obtaining an electric image signal, and reproducing the electron image of the specimen as a visible image on the basis of the image signal.

In the read-out apparatus which detects the light emitted from the stimulable phosphor sheet upon stimulation thereof in order to reproduce the electron microscope image, it is preferred that the stimulating rays scan the stimulable phosphor sheet at a higher density and the image is detected with higher accuracy than in that of the aforesaid radiation image recording and reproducing system. However, the conventional read-out apparatus which has been used in the radiation image recording and reproducing system cannot satisfactorily meet these requirements. That is, in the typical radiation image recording and reproducing system, a light beam deflected in a main scanning direction by a light deflector is caused to enter a main scanning lens system, which may comprise a fθ lens, and is focussed on a stimulable phosphor sheet which is conveyed in a sub-scanning direction at a constant speed. In order to limit the size of the scanning lens system, the fθ lens must have a relatively long focal length and must be at a distance from the stimulable phosphor sheet. Due to the relatively long focal length of the fθ lens, the diameter of the stimulating light beam of the stimulable phosphor sheet cannot be sufficiently small.

This applicant has proposed in U.S. patent application No. 225,443 (now U.S. Pat. No. 4,886,968), a light beam scanning system which is particularly preferable as a read-out apparatus for the system for carrying out the aforesaid method of recording and reproducing electron microscopic images. The light beam scanning system comprises a sheet holding means having a cylindrical sheet support surface on which the stimulable phosphor sheet is held, and a spinner having a light deflector mirror which reflects a stimulating light beam on the central axis of the cylindrical sheet support surface toward the stimulable phosphor sheet on the sheet support surface and a condenser lens system which converges the reflected stimulating light beam on the stimulable phosphor sheet. The stimulating light beam is caused to scan the stimulable phosphor sheet in the main direction by rotation of the spinner, and the sub-scanning is effected by relative movement of the sheet holding means to the spinner.

In this light beam scanning system, the condenser lens system need not be enlarged in size even if it is disposed close to the stimulable phosphor sheet since the main scanning of the stimulating light beam is effected by the rotation of the spinner. Accordingly, the condenser lens system may have a short focal length which converges the stimulating light beam into a small spot on the stimulable phosphor sheet, which permits a high-density read-out of the image information.

However, in the light beam scanning system, there is a problem in that the stimulable phosphor sheet is apt to lift away from the cylindrical sheet support surface of the sheet holding means since the stimulable phosphor sheet which is flat is conveyed onto the cylindrical surface, held thereon and conveyed out therefrom. More particularly, if the stimulable phosphor sheet is rigid due to the large thickness thereof or low environmental temperature, the stimulable phosphor sheet can lift away from the support surface when the stimulable phosphor sheet is conveyed onto the support surface. Though this may be avoided by a pair of guide members which are respectively provided on opposite ends of the support surface and press the stimulable phosphor sheet against the support surface, this approach is disadvantageous in that the end portions of the stimulable phosphor sheet is covered with the guide members and the image information stored on the whole surface of the stimulable phosphor sheet cannot be read out. If the stimulable phosphor sheet is held against the support surface by suction means instead of the guide members, the image information stored on the whole surface of the stimulable phosphor sheet can be read out. However in this case, if the stimulable phosphor sheet lifts significantly away from the stimulable phosphor sheet, the suction means cannot attract the stimulable phosphor sheet. Further, if the suction force provided to the suction means is cut off due to power failure or the like during the read-out operation, the stimulable phosphor sheet will abruptly lift away from the support surface and will interfere with the spinner which is rotating at high speed, which can result in damage to the spinner and/or the stimulable phosphor sheet.

The problems described above are encountered not only in the light beam scanning system in which the stimulable phosphor sheet is employed as the recording medium but also in other light beam scanning systems in which other recording medium such as a photosensitive recording sheet is employed.

SUMMARY OF THE INVENTION

In view of the foregoing observations and description, the primary object of the present invention is to provide a light beam scanning system of the type described above in which the recording medium sheet can be correctly held along the cylindrical recording medium support surface so that the recording medium sheet never interferes with the spinner and the scanning light beam can scan the whole surface of the recording medium sheet with an excellent accuracy.

In accordance with the present invention, there is provided a light beam scanning system comprising a sheet holding means having a concave cylindrical sheet support surface on which a recording medium sheet is supported, a sheet conveying means which conveys the recording medium sheet onto the sheet support surface and away from the same, a suction means which draws the recording medium sheet against the sheet support surface by suction, a scanning light beam source which emits a scanning light beam, a spinner having a light deflector mirror which reflects the scanning light beam on the central axis of the cylindrical sheet support surface toward the recording medium sheet on the sheet support surface and a condenser lens system which converges the reflected scanning light beam on the recording medium sheet, the light deflector mirror and the condenser lens system being integrally rotated about the central axis of the cylindrical sheet support surface to cause the scanning light beam to scan the recording medium sheet in a main scanning direction, a sub-scanning means which moves the sheet holding means in a sub-scanning direction parallel to the central axis relative to the spinner, and a pair of holding rollers which are spaced from each other in the sub-scanning direction with the spinner intervening therebetween and are opposed to the sheet support surface at a distance slightly larger than the thickness of the recording medium sheet so that recording medium sheet can be inserted between the rollers and the sheet support surface, each of the holding rollers being fixedly supported relative to the spinner in the sub-scanning direction and being able to freely rotate about a rotational axis which is parallel to the central axis of the sheet support surface.

The expression "each of the holding rollers being fixedly supported relative to the spinner in the sub-scanning direction" means that each of the holding rollers is held in a fixed position when the spinner does not move in the sub-scanning direction, and that each of the holding rollers is moved integrally with the spinner when the spinner moves in the sub-scanning direction. The condenser lens system may comprise either a single lens or a plurality of optical elements.

With this arrangement, even a rigid recording medium sheet cannot lift away from the sheet support surface by a large distance since the holding rollers prevent it. Accordingly, when the suction means is operated after the recording medium sheet is positioned in a predetermined position, the recording medium sheet can be positively drawn against the sheet support surface by suction. Further, since the rollers are never positioned between the recording sheet medium and the spinner, they do not limit the area of the recording medium sheet which can be scanned by the scanning light beam. Further even if the suction means stops and the recording medium sheet is released, the recording medium cannot lift beyond the holding rollers. Accordingly, the recording medium cannot interfere with the spinner.

DESCRIPTION OF THE PREFERRED EMBODIMENT

Figure 1:
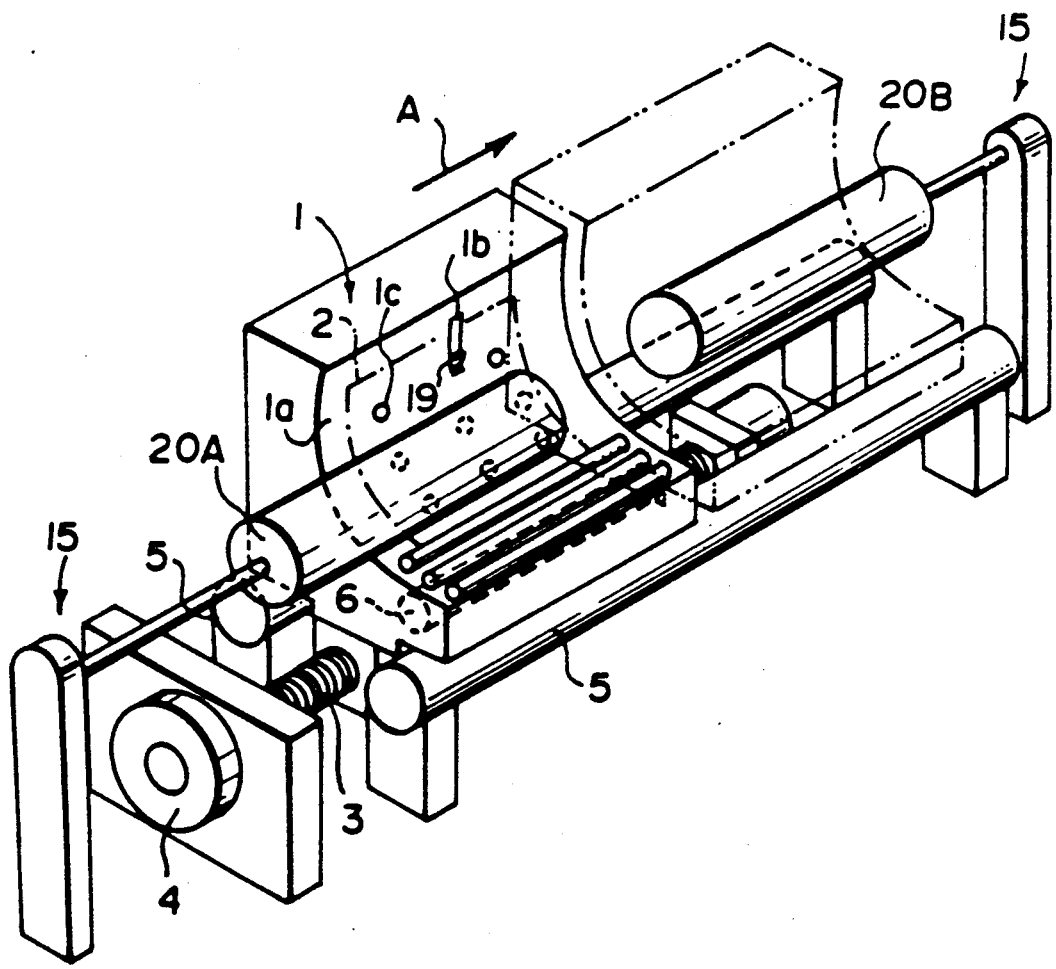
FIG. 1 is a perspective view showing a light beam scanning system in accordance with an embodiment of the present invention with the scanning optical system removed.

In FIG. 1, a stimulable phosphor sheet 2 is held as shown by the chain line on a concave cylindrical sheet support surface 1a of the sheet holding means 1. The lower end portion of the sheet holding means 1 is engaged with a screw rod 3 which is rotated by a motor 4 and moves the sheet holding means 1 at a predetermined speed in the direction shown by the arrow A along a pair of guide rails 5 between the position shown by the solid line and the position shown by the chain line. The screw rod 3, the motor 4 and the guide rails 5 form a sub-scanning means. A lower roller 6 and three upper rollers 7 are provided at the lower end portion of the sheet holding means 1. The stimulable phosphor sheet 2 is conveyed by the rollers 6 and 7 to the sheet support surface 1a at the position shown by the solid line, and is conveyed away from the sheet support surface 1a at the position shown by the chain line. A pair of sheet holding rollers 20A and 20B extend in the direction of the arrow A and are opposed to the sheet support surface 1a at a distance slightly larger than the thickness of the stimulable phosphor sheet 2. The sheet holding rollers 20A and 20B will be described in detail later.

Figure 2:
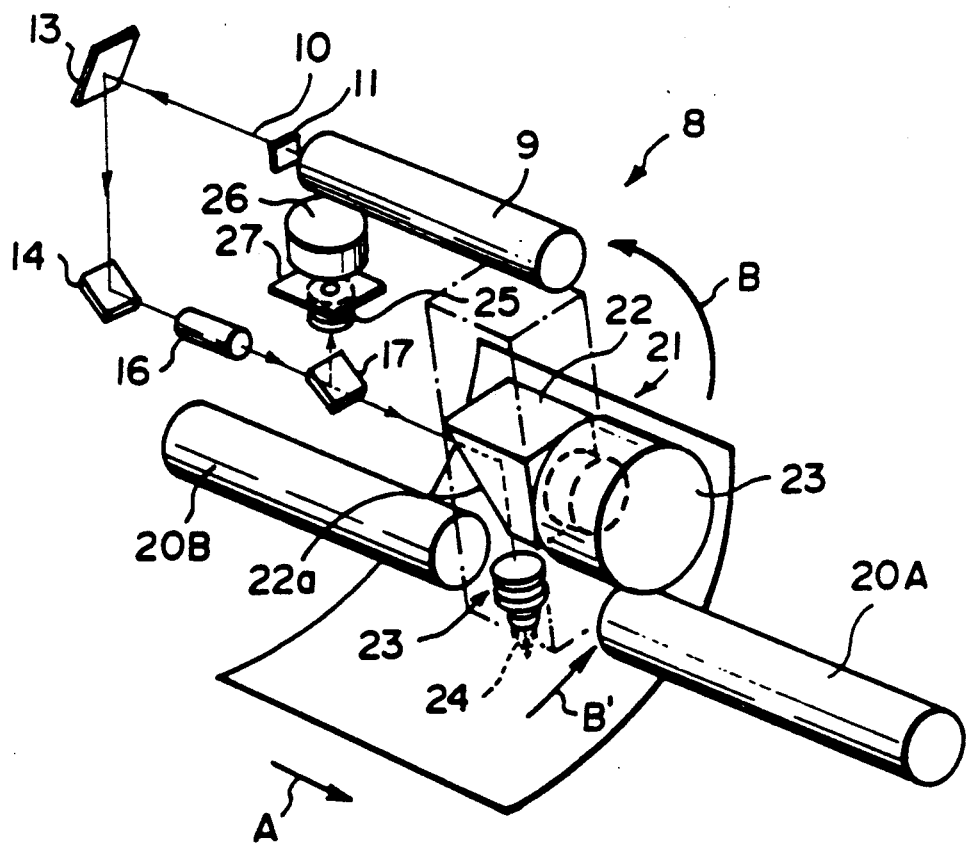
FIG. 2 is a perspective view showing the scanning optical system of the light beam scanning system.
Figure 3:
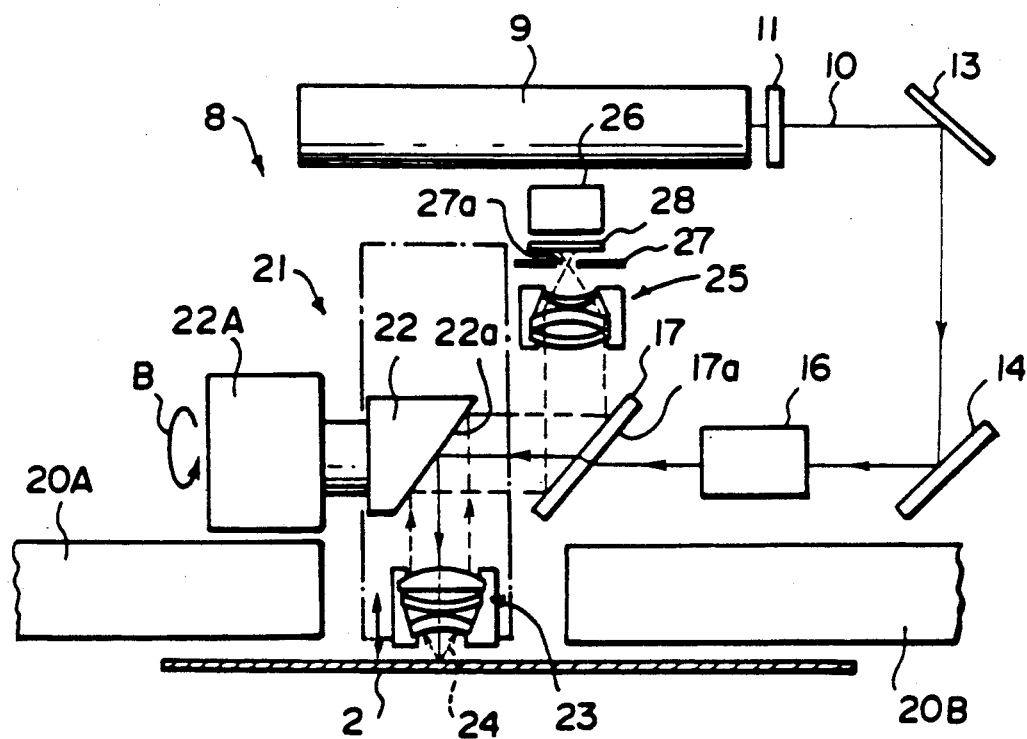
FIG. 3 is a front view of the scanning optical system.

A scanning optical system 8 shown in FIG. 2 is provided above the sheet holding means 1, and the image information stored on the stimulable phosphor sheet 2 is read out by the scanning optical system 8 in the following manner.

The scanning optical system 8 includes a He-Ne laser 9 which emits a laser beam 10 as a stimulating light beam. The laser beam 10 is passed through a filter 11 which cuts off light of unnecessary wavelengths and is reflected by mirrors 13 and 14 to change the optical path thereof. The laser beam 10 reflected by the mirror 14 is transmitted through a beam expander 16 which expands the laser beam 10 to a predetermined diameter, and then impinges upon a dichroic mirror 17 which transmits light having a wavelength within the wavelength range of the laser beam 10 and reflects light having a wavelength within the wavelength range of light emitted by the stimulable phosphor sheet 2 upon stimulation by the laser beam 10. The laser beam 10 passing through the dichroic mirror 17 impinges upon a spinner 21, and is reflected and deflected. The spinner 21 is disposed between the sheet holding rollers 20A and 20B and has a deflector mirror 22 which is continuously rotated at a high speed in the direction of B by a spindle motor 22A. The deflector mirror 22 is provided with a reflection surface 22a inclined at 45° with respect to the laser beam 10 which impinges upon it. The deflector mirror 22 is provided to reflect the laser beam 10 on the central axis of the cylindrical sheet support surface 1a of the sheet holding means 1, and the length of the optical path of the laser beam 10 between the position of the reflection and the stimulable phosphor sheet 2 is kept constant. A condenser lens system 23 for converging the laser beam 10, which enters as a collimated light beam, to a spot having a desired diameter on the stimulable phosphor sheet 2 is provided on the optical path of the laser beam 10 deflected by the deflector mirror 22. The condenser lens system 23 may comprise, for instance, three lenses, and the distance between the condenser lens system 23 and the scanning position on the stimulable phosphor sheet 2 is equal to the focal length f of the condenser lens system 23. The condenser lens system 23 is rotated integrally with the deflector mirror 22 as a part of the spinner 21. The laser beam 10 is reflected and deflected by the spinner 21 to scan the stimulable phosphor sheet 2 in the main scanning direction shown by the arrow B' in FIG. 2. At the same time, the sheet holding means 1 is moved at the predetermined speed in the sub-scanning direction shown by the arrow A as described above. That is, the stimulable phosphor sheet 2 is two-dimensionally scanned by the laser beam 10. In the case where the aforesaid condenser lens system 23 is used, the condenser lens system 23 may be small in diameter even if it is disposed close to the stimulable phosphor sheet 2. Accordingly, a lens system having a short focal length can be used as the condenser lens system 23, whereby the laser beam 10 can be converged into a very small spot and the image information on the stimulable phosphor sheet 2 can be read out at a high density.

The stimulable phosphor sheet 2 is exposed to the laser beam 10, the exposed portion of the stimulable phosphor sheet 2 emits light 24 in an amount proportional to the radiation energy stored thereon. The light 24 is emitted as non-directional light by the exposed portion of the stimulable phosphor sheet 2, and is collimated by the condenser lens system 23 which is spaced by a distance equal to the focal length f from the exposed portion of the stimulable phosphor sheet 2. Then the collimated light 24 is reflected by the deflector mirror 22 of the spinner 21 and the by the dichroic mirror 17. A detection lens system 25 which may comprise, for example, three lenses and converges the emitted light 24 is provided on the optical path of the light 24 reflected by the dichroic mirror 17. The light 24 impinges upon a photomultiplier 26 after converged by the detection lens 25. An aperture plate 27 having an aperture 27a which is of such a size that permits only the converged light to pass therethrough is provided at the position of the convergence of the emitted light 24. That is, when a part of the laser beam 10 impinging upon the stimulable phosphor sheet 2 is reflected by the sheet surface, and the reflected laser beam impinges upon members of the system such as the condenser lens system 23 and is reflected again by the members to impinge upon wrong portions of the stimulable phosphor sheet 2 outside the predetermined portion, the wrong portions are stimulated and emit light. However, the light thus emitted by the wrong portions is passed through the condenser lens system 23 and the detection lens system 25, and is guided to positions different from the position to which the light 24 emitted by the predetermined portion is guided. Thus the light emitted by the wrong portions is intercepted by the aperture plate 27, and is prevented from impinging upon the photomultiplier 26. In this manner, the reflected stimulating rays and the light emitted by the stimulable phosphor sheet 2 by stimulation by scattered stimulating rays are cut off and the image read-out can be carried out with a high accuracy. The laser beam 10 reflected by the stimulable phosphor sheet 2 and passing through the condenser lens system 23 can pass through the aperture 27a of the aperture plate 27 together with the light 24 emitted by the stimulable phosphor sheet 2. Therefore, a cut filter 28 which selectively transmits only light having a wavelength within a wavelength range of the emitted light 24 is provided on the light receiving surface of the photomultiplier 26 in order to cut off the laser beam passing through the aperture 27a. The photomultiplier 26 photoelectrically detects the emitted light 24 and generates electric read-out signals, which are processed by an image processing circuit (not shown), fed to an image reproducing system such as a CRT or a scanning recording system, and used for reproducing as a visible image the image recorded on the stimulable phosphor sheet 2 on the CRT or as a hard copy.

Figure 4A:
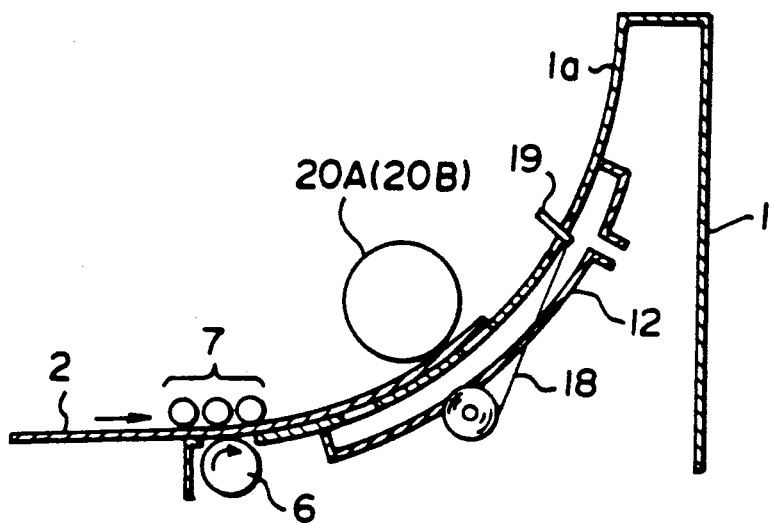
FIGS. 4(a) to 4(c) are views for illustrating the operation of the light beam scanning system.
Figure 4B:
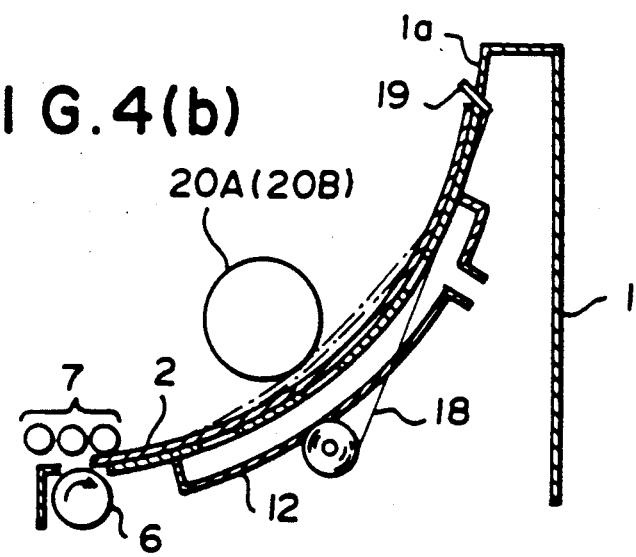

The stimulable phosphor sheet 2 is conveyed onto the sheet holding means 1 when the sheet holding means 1 is in the left side position shown by the solid line in FIG. 1. The lower roller 6 and the upper roller 7 which are provided at the lower end portion of the sheet holding means 1 are movable integrally with the sheet holding means 1, and the stimulable phosphor sheet 2 is conveyed along the sheet support surface 1a of the sheet holding means 1 by the roller 6 and 7 as shown in FIG. 4(a). The sheet holding means 1 is provided with a claw 19 which projects from the sheet support surface 1a so that the leading edge of the stimulable phosphor sheet 2 fed by the roller 6 and 7 abuts against claw 19. The claw 19 is connected to a constant pressure spring 18 and is movable along a slit 1b which is formed in the sheet support surface 1a and extends in the sheet feeding direction. While fed along the sheet support surface 1a, the stimulable phosphor sheet 2 abuts against the claw 19 and forces upward the claw 19 while extending the spring 18 as shown in FIG. 4(b). The rollers 6 and 7, the spring 18 and the claw 19 forms a sheet conveying means in this embodiment.

The sheet holding rollers 20A and 20B are disposed above the sheet holding means 1 in the left side position. The sheet holding rollers 20A and 20B are opposed to the sheet support surface 1a at a distance slightly larger than the thickness of the stimulable phosphor sheet 2, and are respectively supported by supports means 15 for free rotation which are fixed to the base (not shown) on which the overall system is mounted.

When the stimulable phosphor sheet 2 has a large rigidity, the stimulable phosphor sheet 2 can lift away from the sheet support surface 1a as shown by the chain line in FIG. 4(b) while it is conveyed onto the sheet support surface 1a. However, the stimulable phosphor sheet 2 cannot lift away from the sheet support surface 1a by a large distance since the holding rollers 20A and 20B prevent it.

When the trailing end of the stimulable phosphor sheet 2 is released from the rollers 6 and 7, the stimulable phosphor sheet 2 stops there (the position shown in FIG. 4(b)). This position is said predetermined position. In this position, the stimulable phosphor sheet 2 is exposed to the stimulating rays. Before exposed to the stimulating rays, the stimulable phosphor sheet 2 is drawn against the sheet support surface 1a by suction. That is, a plurality of suction holes 1c are formed in the sheet support surface 1a, and a suction box 12 is mounted on the lower surface of the sheet support surface 1a. The suction box 12 is connected to a suitable vacuum source such as an air pump (not shown). When the stimulable phosphor sheet 2 is conveyed to the predetermined position, the suction box 12 begins to operate and draws the stimulable phosphor sheet 2 against the sheet support surface 1a by suction by way of the suction holes 1c. The suction force of the suction box 12 is such that the stimulable phosphor sheet 2 can be held in the predetermined position on the sheet support surface 1a solely by suction overcoming the force of the spring 18, and such that the stimulable phosphor sheet 2 can be drawn even if it has lifted away from the sheet support surface 1a. In order to positively draw the stimulable phosphor sheet 2 by suction, the stimulable phosphor sheet 2 should not lift away from the sheet support surface 1a by a distance larger than about 1 mm. For this purpose, the distance between the sheet holding rollers 20A and 20B and the sheet support surface 1a is preferably about 1 mm.

Figure 4C:
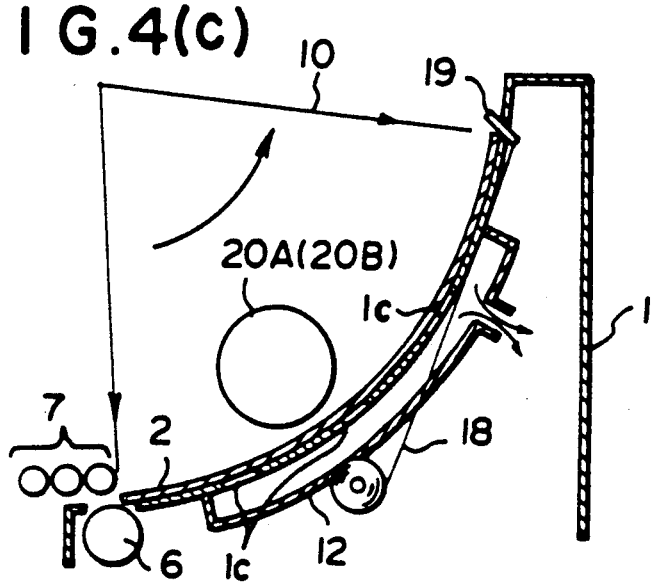

When the stimulable phosphor sheet 2 is drawn against the sheet support surface 1a by suction, the upper rollers 7 is moved leftward away from the stimulable phosphor sheet 2 as shown in FIG. 4(c), thereby permitting the lower end portion of the stimulable phosphor sheet 2 to be exposed to the stimulating rays.

After, the upper rollers 7 are retracted away from the stimulable phosphor sheet 2, the read-out is carried out while the sheet holding means 1 is moved in the direction of the arrow A at a constant speed. At least one of the sheet holding rollers 20A and 20B is above the stimulable phosphor sheet 2 no matter where the sheet holding means 1 is between the position shown by the solid line and the position shown by the chain line in FIG. 1. Accordingly, even if the suction force is cut off due to power failure during the read-out and the stimulable phosphor sheet 2 is released from the sheet support surface 1a, the sheet holding rollers 20A and 20B prevent the stimulable phosphor sheet 2 from interfering with the spinner 21 which is rotating.

At the time the read-out is finished, the sheet support surface 1a is in the right side position shown by the chain line in FIG. 1, and the stimulable phosphor sheet 2 is taken out from the sheet holding means 1. That is, when the read-out is finished, the upper rollers 7 are returned to the position where they are opposed to the lower roller 6, the suction box 12 is stopped. When the suction box 12 is stopped and the stimulable phosphor sheet 2 released, the stimulable phosphor sheet 2 is pushed downward to between the rollers 6 and 7 under the force of the spring 18 by way of the claw 19. When the rollers 6 and 7 are rotated in the reverse direction, the stimulable phosphor sheet 2 is conveyed away from the sheet holding means 1.

As can be understood from the description above, the sheet holding rollers 20A and 20B minimize the lift of the stimulable phosphor sheet 2 when the stimulable phosphor sheet 2 is conveyed onto the sheet support surface 1a, thereby preventing unsatisfactory mounting of the stimulable phosphor sheet 2. Further, even if the stimulable phosphor sheet 2 is released by accident during the read-out operation, the sheet holding rollers 20A and 20B prevent the stimulable phosphor sheet 2 from interfering with the spinner 21. Further, since the means for holding the side edges of the stimulable phosphor sheet 2 in order to prevent lift of the stimulable phosphor sheet 2 can be eliminated, the stimulable phosphor sheet 2 can be exposed to the stimulating rays over the entire width thereof. Further, by retracting the rollers 7 away from the stimulable phosphor sheet 2, the stimulable phosphor sheet 2 can be exposed to the stimulating rays over the entire length thereof.

The respective parts of the scanning system in accordance with the present invention need not be limited to those employed in the embodiment described above. For example, the means for feeding back and forth the stimulable phosphor sheet along the sheet support surface need not be limited to the rollers and the spring but one of the upper rollers and the lower roller may be an endless belt, and nip rollers may be provided on the upper end of the sheet support surface instead of the spring.

A normal half-silvered mirror may be used instead of the dichroic mirror which leads the stimulating light beam to the stimulable phosphor sheet and at the same time leads the light emitted by the stimulable phosphor sheet to the photodetector so long as both the stimulating light beam and the light emitted from the stimulable phosphor sheet have sufficient intensity. Further, instead of moving the sheet holding means in order to effect the sub-scanning, the scanning optical system may be moved. In this case, the sheet holding rollers are moved integrally with the optical system.

Though, in the embodiment described above, the present invention is applied to the read-out system in which the stimulable phosphor sheet is employed as the recording medium, the present invention can also be applied to other various read-out systems and recording systems in which a recording medium sheet other than the stimulable phosphor sheet is employed as the recording medium.

I claim:
1. A light beam scanning system comprising a sheet holding means having a concave cylindrical sheet support surface on which a recording medium sheet is supported, a sheet conveying means which conveys the recording medium sheet onto the sheet support surface and away from the same, a suction means which draws the recording medium sheet against the sheet support surface by suction, a scanning light beam source which emits a scanning light beam, a spinner having a light deflector mirror which reflects the scanning light beam on the central axis of the cylindrical sheet support surface toward the recording medium sheet on the sheet support surface and a condenser lens system which converges the reflected scanning light beam on the recording medium sheet, the light deflector mirror and the condenser lens system being integrally rotated about the central axis of the cylindrical sheet support surface to cause the scanning light beam to scan the recording medium sheet in a main scanning direction, a sub-scanning means which moves the sheet holding means in a sub-scanning direction parallel to the central axis relative to the spinner, and a pair of holding rollers which are spaced from each other in the sub-scanning direction with the spinner intervening therebetween and are opposed to an intermediate portion of the sheet support surface at a distance slightly larger than the thickness of the recording medium sheet so that the recording medium sheet can be inserted between the rollers and the sheet support surface to attendantly prevent the recording medium sheet from lifting away from the sheet support surface beyond said distance, each of the holding rollers being fixedly supported relative to the spinner in the sub-scanning direction and being able to freely rotate about a rotational axis which is parallel to the central axis of the sheet support surface.

2. A light beam scanning system according to claim 1, wherein said sheet conveying means is disposed at a lower end portion of said sheet support surface.

3. A light beam scanning system according to claim 2, wherein said sheet conveying means comprises a lower roller and a plurality of retractable, upper rollers, said upper rollers being retracted away from said recording medium sheet while the scanning light beam scans the recording medium sheet thereby exposing a lower end portion of the recording medium sheet.

* * * * *

UNITED STATES PATENT AND TRADEMARK OFFICE
CERTIFICATE OF CORRECTION

PATENT NO. : 5,025,157
DATED : June 18, 1991
INVENTOR(S) : Katsuaki Muraishi It is certified that error appears in the above-identified patent and that said Letters Patent is hereby corrected as shown below:

Title page at item [19], change "Katsuaki" to --Muraishi--.

Title page at item [75], change "Muraishi Katsuaki" to --Katsuaki Muraishi--.

Signed and Sealed this

Twenty-seventh Day of October, 1992

Attest:

DOUGLAS B. COMER

*Attesting Officer*    *Acting Commissioner of Patents and Trademarks*